A. GOTTSCHALK.
HOSE SUPPORTER.
APPLICATION FILED AUG. 1, 1912.

1,041,618.
Patented Oct. 15, 1912.

Witnesses:
Chas. E. Whitman
H. D. Penney

Inventor:
Anna Gottschalk.
By her Attorney,

UNITED STATES PATENT OFFICE.

ANNA GOTTSCHALK, OF BERLIN, GERMANY.

HOSE-SUPPORTER.

1,041,618.   Specification of Letters Patent.   Patented Oct. 15, 1912.

Application filed August 1, 1912. Serial No. 712,671.

*To all whom it may concern:*

Be it known that I, ANNA GOTTSCHALK, a subject of the Emperor of Germany, residing in Berlin, Germany, Unter den Linden 75, have invented certain new and useful Improvements in Hose-Supporters, of which the following is a specification.

The present invention relates to a hose supporter of the kind with which the fabric of the hose is laid around a globular body and is forced with the latter into a loop, in which it is then clamped. Such hose supporters are known in various types. These known types however show the disadvantage that either the loop will easily become detached and the hose is therefore not securely held, or that a friction is caused between the hose and the loop, generally made of wire, on the loop being tightened, and such friction will then easily damage the fabric. These disadvantages have been avoided by the hose supporter according to the present invention.

According to this invention the plate which is attached to the supporter band and is made of sheet metal or any other suitable material carries a pivotally fitted lever, to which a loop preferably made of cord is attached in such a manner, that when the lever is turned up, the loop will be slightly drawn upward. The loop is passed through an eye secured to the plate and will therefore be narrowed when it is drawn upward. To the said plate or to the lever is also attached a second cord or the like, the end of which carries a globular body, for instance a knot. The fabric of the hose is now laid around this globular body, forced with the same through the loop and the lever is turned over, whereby the loop is narrowed so far, that the globular body together with the fabric of the hose is tightly gripped.

In the accompanying drawings the invention is exemplified.

Figure 1:
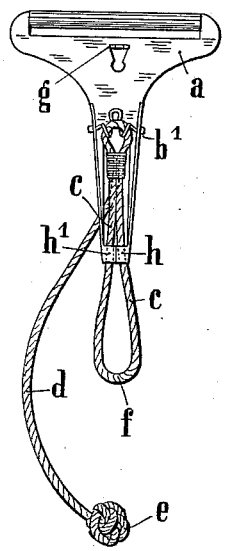
Figure 2:
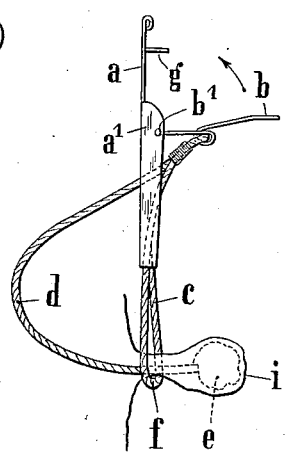
Figure 3:
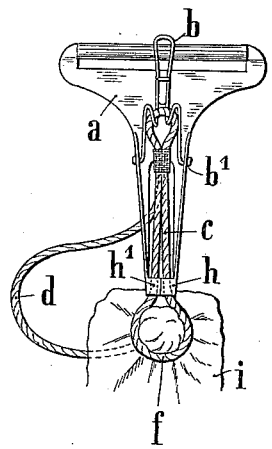
Figure 4:
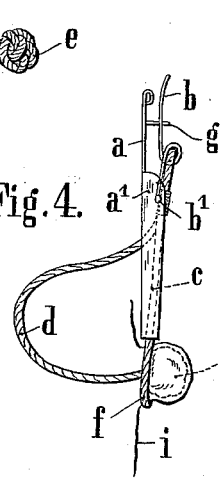
Figure 5:
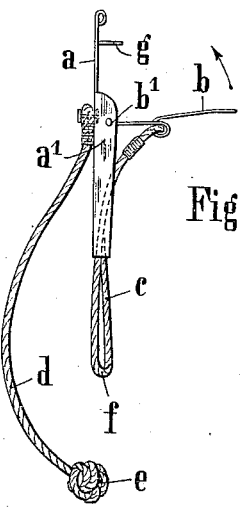

Figure 1 is a constructional form of the hose supporter when not in use with the lever turned down. Fig. 2 is a side view of Fig. 1, showing the fabric of the hose already passed through the loop together with the globular body. Figs. 3 and 4 are front and side elevations of the same constructional form in operative position, the lever being turned up. Fig. 5 lastly shows a modified form of the supporter.

On the plate or buckle $a$ made in known manner of sheet metal or any other suitable material such as celluloid and the like, to which the supporter band is attached, are provided two flanges $a'$ in which a lever $b$ preferably made of wire is pivoted at $b'$. To the central part of the lever is attached a loop $c$ preferably made of cord, and a second cord $d$ which terminates at its free end in a knot $e$. At the upper end of the plate $a$ is provided a projection or hook $g$, preferably by stamping out the material of the plate, which hook is adapted to engage in the lever $b$, when the latter has been turned over in the direction indicated by the arrow in Fig. 2, and to hold the said lever in such operative position. At the lower end of the flanges $a'$ these are bent over at $h$, $h'$ forming an eye, through which the loop is passed.

In non-operative position the several parts assume the positions shown in Fig. 1. When a hose or the like is to be secured to the supporter, the fabric of said hose or the like $i$ is laid close to its edge over the knot $e$ and passed with this knot through the loop $c$, as shown in Fig. 2. Then the lever $b$ is turned upward in the direction indicated by the arrow in Fig. 2, and thereby the loop will be drawn upward through the eye $h$, $h'$ so that it will be narrowed. The lower portion $f$ of the loop $c$ will then tightly grip the knot $e$ and with it the fabric of the hose laid over it. The projection $g$ will securely hold the lever $b$ in operative position. It is obvious that this latter arrangement may also be carried out in many other ways.

From the hereinbefore facts it will be evident, that this method of securing the hose will be very reliable, without any friction being produced between the loop, which is being tightened and the fabric or between the latter and the knot or the globular body employed.

It is not necessary, that the cord $d$ be also secured to the lever $b$, as it is shown in Figs. 1 to 4. The cord may be secured in any other suitable manner to the plate $a$. It is only necessary that the cord $d$ admits of a free play of the knot $e$, so that the latter may, on the loop being pulled, readily follow this movement.

I claim:

A hose supporter consisting of a plate for attachment to the supporter band, a lever pivoted to said plate, an eye on said plate, a loop attached to said lever and passed through said eye, said lever being adapted to pull said loop through said eye to narrow the loop when the lever is swung to closed position, a cord having one end attached to the supporter and the other end terminating in a globular body, and adapted to be passed with its globular end inclosed by the fabric of the hose through said loop to be secured therein when the lever is swung to closed position, and means for retaining the lever in closed position.

In witness whereof I have hereunto signed my name in the presence of two subscribing witnesses this 19th day of July, 1912.

ANNA GOTTSCHALK.

Witnesses:
WOLDEMAR HAUPT,
HENRY HASPER.

Copies of this patent may be obtained for five cents each, by addressing the "Commissioner of Patents, Washington, D. C."